(12) United States Patent  (10) Patent No.: US 7,640,351 B2
Reckamp et al.  (45) Date of Patent: Dec. 29, 2009

(54) APPLICATION UPDATING IN A HOME AUTOMATION DATA TRANSFER SYSTEM

(75) Inventors: Steven R. Reckamp, Hoffman Estates, IL (US); Miky Dinescu, Rosemont, IL (US); Joseph Mazza, Warrenville, IL (US); Gregory J. Aper, Schaumburg, FL (US); Michael Pelland, Medinah, IL (US); Brendan Doorhy, Westmont, IL (US); Brian Gaza, Naperville, IL (US); Jeffrey K. Bovee, Twin Lakes, WI (US); Tim Duitsman, Naperville, IL (US)

(73) Assignee: Intermatic Incorporated, Spring Grove, IL (US)

( * ) Notice: Subject to any disclaimer, the term of this patent is extended or adjusted under 35 U.S.C. 154(b) by 98 days.

(21) Appl. No.: 11/590,253

(22) Filed: Oct. 31, 2006

(65) Prior Publication Data

US 2007/0143440 A1  Jun. 21, 2007

Related U.S. Application Data

(60) Provisional application No. 60/733,514, filed on Nov. 4, 2005.

(51) Int. Cl.
*G06F 15/16* (2006.01)
*G06F 12/00* (2006.01)
(52) U.S. Cl. ....................... 709/230; 709/250
(58) Field of Classification Search ................. 709/230, 709/250, 226–229, 217–218
See application file for complete search history.

(56) References Cited

U.S. PATENT DOCUMENTS

| 4,063,220 A | 12/1977 | Metcalfe et al. |
|---|---|---|
| 4,332,027 A | 5/1982 | Malcolm et al. |
| 4,426,697 A | 1/1984 | Petersen et al. |
| 4,523,299 A | 6/1985 | Donohue et al. |
| 4,548,554 A | 10/1985 | Angott |
| 4,563,592 A | 1/1986 | Yuhasz et al. |

(Continued)

OTHER PUBLICATIONS

Juniper Networks, Inc., *Routing Protocols Configuration Guide*, JUNOS Internet Software for J-Series, and t-Series Routing Platforms, 2005.

(Continued)

*Primary Examiner*—Zarni Maung
(74) *Attorney, Agent, or Firm*—Brinks Hofer Gilson & Lione

(57) ABSTRACT

An automation network includes automation network devices connected to the network and a system level interface that interfaces with a transport layer and an application layer of the automation network. A method is disclosed that programs an automation network device in communication with an automation network, where the automation network includes an access point coupled with an external network. The method includes receiving application upgrade data at the access point, where the application upgrade data includes upgrade data associated with a target automation network device in communication with the automation network. Application upgrade data is transmitted through the home to the target automation network device. A next application upgrade data packet to be transmitted across the automation network is requested from the target automation network device. An application stored in the target automation network device is programmed, using an application upgrade data command transmitted to the target home automation network device.

20 Claims, 13 Drawing Sheets

U.S. PATENT DOCUMENTS

| | | |
|---|---|---|
| 4,575,660 A | 3/1986 | Zaharchuk et al. |
| 4,623,886 A | 11/1986 | Livingston |
| 4,630,264 A | 12/1986 | Wah et al. |
| 4,649,323 A | 3/1987 | Pearlman et al. |
| 4,678,985 A | 7/1987 | Moskin |
| 4,686,380 A | 8/1987 | Angott |
| 4,686,848 A | 8/1987 | Casselberry et al. |
| 4,689,547 A | 8/1987 | Rowen et al. |
| 4,692,762 A | 9/1987 | Lewiner et al. |
| 4,692,918 A | 9/1987 | Elliott et al. |
| 4,703,306 A | 10/1987 | Barritt |
| 4,715,030 A | 12/1987 | Koch et al. |
| 4,727,296 A | 2/1988 | Zaharchuk et al. |
| 4,728,949 A | 3/1988 | Platte et al. |
| 4,733,138 A | 3/1988 | Pearlman et al. |
| 4,745,351 A | 5/1988 | Rowen et al. |
| 4,749,917 A | 6/1988 | Angott et al. |
| 4,749,992 A | 6/1988 | Fitzemeyer et al. |
| 4,754,255 A | 6/1988 | Sanders et al. |
| 4,755,792 A | 7/1988 | Pezzolo et al. |
| 4,764,981 A | 8/1988 | Miyahara et al. |
| 4,772,825 A | 9/1988 | Tabor et al. |
| 4,783,581 A | 11/1988 | Flowers et al. |
| 4,809,268 A | 2/1989 | Tejima et al. |
| 4,823,123 A | 4/1989 | Siwiak |
| 4,825,200 A | 4/1989 | Evans et al. |
| 4,833,339 A | 5/1989 | Luchaco et al. |
| 4,841,221 A | 6/1989 | Barney et al. |
| 4,855,713 A | 8/1989 | Brunius |
| 4,857,759 A | 8/1989 | Murphy et al. |
| 4,875,038 A | 10/1989 | Siwiak et al. |
| 4,878,052 A | 10/1989 | Schulze |
| 4,881,148 A | 11/1989 | Lambropoulos et al. |
| 4,882,579 A | 11/1989 | Siwiak |
| 4,889,999 A | 12/1989 | Rowen |
| 4,891,637 A | 1/1990 | Siwiak et al. |
| 4,905,279 A | 2/1990 | Nishio |
| 4,912,461 A | 3/1990 | Cenzano, Jr. et al. |
| 4,918,690 A | 4/1990 | Markkula, Jr. et al. |
| 4,924,151 A | 5/1990 | D'Aleo et al. |
| 4,924,237 A | 5/1990 | Honda et al. |
| 4,929,887 A | 5/1990 | Robitaille et al. |
| 4,947,054 A | 8/1990 | Flowers et al. |
| 4,947,162 A | 8/1990 | Kimura |
| 4,956,826 A | 9/1990 | Coyman et al. |
| 4,979,168 A | 12/1990 | Courtois et al. |
| 4,995,053 A | 2/1991 | Simpson et al. |
| 5,005,211 A | 4/1991 | Yuhasz |
| 5,017,837 A | 5/1991 | Hanna et al. |
| 5,029,209 A | 7/1991 | Strong, Jr. et al. |
| 5,029,334 A | 7/1991 | Braun et al. |
| 5,038,346 A | 8/1991 | Courtois |
| 5,042,083 A | 8/1991 | Ichikawa |
| 5,051,720 A | 9/1991 | Kittirutsunetorn |
| 5,053,883 A | 10/1991 | Johnson |
| 5,059,871 A | 10/1991 | Pearlman et al. |
| 5,081,402 A | 1/1992 | Koleda |
| 5,086,385 A | 2/1992 | Launey et al. |
| 5,099,193 A | 3/1992 | Moseley et al. |
| 5,109,222 A | 4/1992 | Welty |
| 5,124,991 A | 6/1992 | Allen |
| 5,129,096 A | 7/1992 | Burns |
| 5,134,347 A | 7/1992 | Koleda |
| 5,146,153 A | 9/1992 | Luchaco et al. |
| 5,160,853 A | 11/1992 | Simon et al. |
| 5,160,924 A | 11/1992 | Conil et al. |
| 5,170,068 A | 12/1992 | Kwiatkowski et al. |
| 5,187,655 A | 2/1993 | Post et al. |
| 5,191,265 A | 3/1993 | D'Aleo et al. |
| 5,195,025 A | 3/1993 | Boecker et al. |
| 5,196,782 A | 3/1993 | D'Aleo et al. |
| 5,212,478 A | 5/1993 | Moseley |
| 5,218,552 A | 6/1993 | Stirk et al. |
| 5,237,264 A | 8/1993 | Moseley et al. |
| 5,237,319 A | 8/1993 | Hidaka et al. |
| 5,239,205 A | 8/1993 | Hoffman et al. |
| 5,248,919 A | 9/1993 | Hanna et al. |
| 5,268,668 A | 12/1993 | Berube |
| 5,291,193 A | 3/1994 | Isobe et al. |
| 5,340,954 A | 8/1994 | Hoffman et al. |
| 5,352,957 A | 10/1994 | Werner |
| 5,382,947 A | 1/1995 | Thaler et al. |
| 5,399,940 A | 3/1995 | Hanna et al. |
| 5,410,326 A | 4/1995 | Goldstein |
| 5,420,572 A | 5/1995 | Dolin, Jr. et al. |
| 5,430,356 A | 7/1995 | Ference et al. |
| 5,452,291 A | 9/1995 | Eisenhandler et al. |
| 5,453,738 A | 9/1995 | Zirkl et al. |
| 5,455,464 A | 10/1995 | Gosling |
| 5,463,286 A | 10/1995 | D'Aleo et al. |
| 5,485,058 A | 1/1996 | Watson et al. |
| 5,489,827 A | 2/1996 | Xia |
| 5,506,715 A | 4/1996 | Zhu |
| 5,530,322 A | 6/1996 | Ference et al. |
| 5,544,036 A | 8/1996 | Brown, Jr. et al. |
| 5,544,037 A | 8/1996 | Luger |
| 5,550,816 A | 8/1996 | Hardwick et al. |
| 5,565,855 A | 10/1996 | Knibbe |
| 5,589,741 A | 12/1996 | Terman et al. |
| 5,623,256 A | 4/1997 | Marcoux |
| 5,627,527 A | 5/1997 | Mehta |
| 5,629,868 A | 5/1997 | Tessier et al. |
| 5,637,930 A | 6/1997 | Rowen et al. |
| 5,637,964 A | 6/1997 | Hakkarainen et al. |
| 5,642,101 A | 6/1997 | Stirk et al. |
| 5,671,387 A | 9/1997 | Jacobs et al. |
| 5,710,908 A | 1/1998 | Man |
| 5,712,450 A | 1/1998 | Chan et al. |
| 5,726,644 A | 3/1998 | Jednacz et al. |
| 5,731,664 A | 3/1998 | Posa |
| 5,736,965 A | 4/1998 | Mosebrook et al. |
| 5,737,318 A | 4/1998 | Melnik |
| 5,774,063 A | 6/1998 | Berry et al. |
| 5,793,300 A | 8/1998 | Suman et al. |
| 5,798,581 A | 8/1998 | Keagy et al. |
| 5,818,128 A | 10/1998 | Hoffman et al. |
| 5,838,226 A | 11/1998 | Houggy et al. |
| 5,848,054 A | 12/1998 | Mosebrook et al. |
| 5,875,179 A | 2/1999 | Tikalsky |
| 5,886,894 A | 3/1999 | Rakoff |
| 5,898,384 A | 4/1999 | Alt et al. |
| 5,898,386 A | 4/1999 | Kaihatsu |
| 5,903,226 A | 5/1999 | Suman et al. |
| 5,905,442 A | 5/1999 | Mosebrook et al. |
| 5,909,087 A | 6/1999 | Bryde et al. |
| 5,909,183 A * | 6/1999 | Borgstahl et al. ...... 340/825.22 |
| 5,916,306 A | 6/1999 | Ruiz |
| 5,945,921 A | 8/1999 | Seo et al. |
| 5,949,200 A | 9/1999 | Ference et al. |
| 5,959,539 A | 9/1999 | Adolph et al. |
| 5,962,991 A | 10/1999 | Levy |
| 5,962,992 A | 10/1999 | Huang et al. |
| 5,978,364 A | 11/1999 | Melnik |
| 5,978,371 A | 11/1999 | Mason, Jr. et al. |
| 5,982,103 A | 11/1999 | Mosebrook et al. |
| 5,987,205 A | 11/1999 | Moseley et al. |
| 5,990,635 A | 11/1999 | Ference et al. |
| 6,009,274 A * | 12/1999 | Fletcher et al. ............. 717/173 |
| 6,011,755 A | 1/2000 | Mulhall et al. |
| 6,021,324 A | 2/2000 | Sizer, II et al. |
| 6,037,721 A | 3/2000 | Lansing et al. |
| 6,046,550 A | 4/2000 | Ference et al. |
| 6,108,614 A | 8/2000 | Lincoln et al. |
| 6,114,812 A | 9/2000 | Lee |

| | | |
|---|---|---|
| 6,120,262 A | 9/2000 | McDonough et al. |
| 6,122,678 A | 9/2000 | Eckel et al. |
| 6,124,804 A | 9/2000 | Kitao et al. |
| 6,138,241 A | 10/2000 | Eckel et al. |
| 6,148,241 A | 11/2000 | Ludtke et al. |
| 6,160,491 A | 12/2000 | Kitao et al. |
| 6,169,377 B1 | 1/2001 | Bryde et al. |
| 6,174,073 B1 | 1/2001 | Regan et al. |
| 6,175,860 B1 | 1/2001 | Gaucher |
| 6,188,181 B1 | 2/2001 | Sinha et al. |
| 6,192,282 B1 | 2/2001 | Smith et al. |
| 6,198,079 B1 | 3/2001 | Essig |
| 6,198,408 B1 | 3/2001 | Cohen |
| 6,229,433 B1 | 5/2001 | Rye et al. |
| 6,237,049 B1 | 5/2001 | Ludtke |
| 6,262,976 B1 | 7/2001 | McNamara |
| 6,297,746 B1 | 10/2001 | Nakazawa et al. |
| 6,300,727 B1 | 10/2001 | Bryde et al. |
| 6,310,440 B1 | 10/2001 | Lansing et al. |
| 6,310,547 B1 | 10/2001 | Parker |
| 6,348,768 B1 | 2/2002 | Weng |
| 6,374,079 B1 | 4/2002 | Hsu |
| 6,380,696 B1 | 4/2002 | Sembhi et al. |
| 6,385,732 B1 | 5/2002 | Eckel et al. |
| 6,388,399 B1 | 5/2002 | Eckel et al. |
| 6,388,400 B1 | 5/2002 | Noh |
| 6,456,892 B1 | 9/2002 | Dara-Abrams et al. |
| 6,459,938 B1 | 10/2002 | Ito et al. |
| 6,466,971 B1 | 10/2002 | Humpleman et al. |
| 6,473,661 B1 | 10/2002 | Wollner |
| 6,496,862 B1 | 12/2002 | Akatsu et al. |
| 6,525,669 B1 | 2/2003 | Ohashi et al. |
| 6,538,556 B1 | 3/2003 | Kawajiri |
| 6,545,434 B2 | 4/2003 | Sembhi et al. |
| 6,574,234 B1 | 6/2003 | Myer et al. |
| 6,615,088 B1 | 9/2003 | Myer et al. |
| 6,630,800 B2 | 10/2003 | Weng |
| 6,636,005 B2 | 10/2003 | Wacyk et al. |
| 6,650,029 B1 | 11/2003 | Johnston |
| 6,653,933 B2 | 11/2003 | Raschke et al. |
| 6,667,578 B2 | 12/2003 | Lansing et al. |
| 6,674,248 B2 | 1/2004 | Newman, Jr. et al. |
| 6,680,586 B1 | 1/2004 | Chen |
| 6,687,487 B1 | 2/2004 | Mosebrook et al. |
| 6,724,339 B2 | 4/2004 | Conway et al. |
| 6,727,446 B1 | 4/2004 | Mayo et al. |
| 6,744,771 B1 | 6/2004 | Barber et al. |
| 6,759,967 B1 | 7/2004 | Staller |
| 6,771,182 B1 | 8/2004 | Loh et al. |
| 6,774,813 B2 | 8/2004 | van Ee et al. |
| 6,801,507 B1 | 10/2004 | Humpleman et al. |
| 6,857,012 B2 | 2/2005 | Sim et al. |
| 6,892,230 B1 | 5/2005 | Gu et al. |
| 7,155,305 B2 | 12/2006 | Hayes et al. |
| 7,165,056 B2 | 1/2007 | Bodin et al. |
| 2002/0064267 A1 | 5/2002 | Martin et al. |
| 2002/0112077 A1 | 8/2002 | Semaan et al. |
| 2002/0124094 A1 | 9/2002 | Chang et al. |
| 2003/0051032 A1 | 3/2003 | Schenkel et al. |
| 2003/0088421 A1 | 5/2003 | Maes et al. |
| 2004/0057464 A1 | 3/2004 | Sanders |
| 2005/0076333 A1* | 4/2005 | Leclair et al. ............... 717/176 |
| 2005/0078672 A1 | 4/2005 | Caliskan et al. |
| 2005/0108571 A1 | 5/2005 | Lu et al. |
| 2005/0120106 A1* | 6/2005 | Albertao .................... 709/223 |
| 2005/0188049 A1 | 8/2005 | Perret et al. |
| 2005/0210459 A1* | 9/2005 | Henderson et al. .......... 717/168 |
| 2006/0017734 A1 | 1/2006 | Faraday et al. |
| 2006/0036733 A1 | 2/2006 | Fujimoto et al. |
| 2006/0059480 A1* | 3/2006 | Kimoto .................... 717/172 |
| 2006/0283965 A1 | 12/2006 | Mueller et al. |

OTHER PUBLICATIONS

US 6,720,744, 04/2004, Black et al. (withdrawn)

* cited by examiner

# APPLICATION UPDATING IN A HOME AUTOMATION DATA TRANSFER SYSTEM

PRIORITY CLAIM

The present application claims the benefit of priority of U.S. Provisional Application Ser. No. 60/733,514, "Data Transfer System," filed Nov. 4, 2005, the contents of which are incorporated by reference in their entirety herein.

RELATED APPLICATIONS

This application is related to U.S. patent application Ser. No. 11/590,644, "Device Types and Units for a Home Automation Data Transfer System,"; U.S. patent application Ser. No. 11/590,643, "Proxy Commands and Devices for a Home Automation Data Transfer System,"; U.S. patent application Ser. No. 11/590,685, "Messaging in a Home Automation Data Transfer System,"; and U.S. patent application Ser. No. 11/590,670, "Remote Device Management in a Home Automation Data Transfer System,"; and U.S. patent application Ser. No. 11/590,672, "Protocol Independent Application Layer for an Automation Network,", all filed on the same day herewith, the contents of which are all incorporated by reference in their entirety herein.

TECHNICAL FIELD

The present invention is related to automation network organization. In particular, the present invention is related to updating applications in an automation network.

BACKGROUND

In developing a series of home automation devices, a large part of development may be spent in repetitive tasks to create network interface software. These tasks may include adding and removing nodes from the network, testing network connectivity, and updating network topology. A number of developers may develop offshoot products based on the home automation network. A large amount of time may be spent in training these developers on the underlying protocol and on these repetitive tasks.

The current home automation network models may place the PC at the center of the home automation system. Users are required to have a PC running all the time to ensure proper operation. Once the PC is removed from the system, network and application software become difficult to upgrade in the field.

Further, home automation networks have, in the past, been designed from and engineering point of view and may require large bandwidth to operate. The user interface and system understanding may require a large amount of technical background. Existing product development platforms may require the developer to understand the underlying network protocol or mandate rewrites of software to accommodate new networks on which the applications operate.

Existing software development platforms may not be portable to multiple network protocols. Porting the applications may not be possible if the network were expanded across different protocols. Also, interconnecting multiple network protocols requires that a specialized device be made to make each device look like its analog in the other protocol.

BRIEF SUMMARY

A system layer interface is disclosed. The system layer interface may operate between a transport layer and an application layer in a network stack model. The system layer interface provides an abstraction interface to implement the system layer, and applications to interface with the network transport layer without requiring the developer to understand or work with the network transport layer functionality directly. By providing a library of commands and/or functions for application development related to an underlying network, and by storing detailed information about devices in the network, this abstraction may simplify the network interface and may enable rapid software development for use with the network. The system layer interface allows access to the underlying network and hardware, while still maintaining the abstraction.

A method is disclosed that programs an automation network device in communication with an automation network, where the automation network includes an access point coupled with an external network. The method includes receiving application upgrade data at the access point, where the application upgrade data includes upgrade data associated with a target automation network device in communication with the automation network. Application upgrade data is transmitted through the home to the target automation network device. A next application upgrade data packet to be transmitted across the automation network is requested from the target automation network device. An application stored in the target automation network device is programmed, using an application upgrade set command transmitted to the target automation network device. The disclosed method may allow an efficient upgrade of processors in the target network device without requiring knowledge of the underlying network transport functions.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
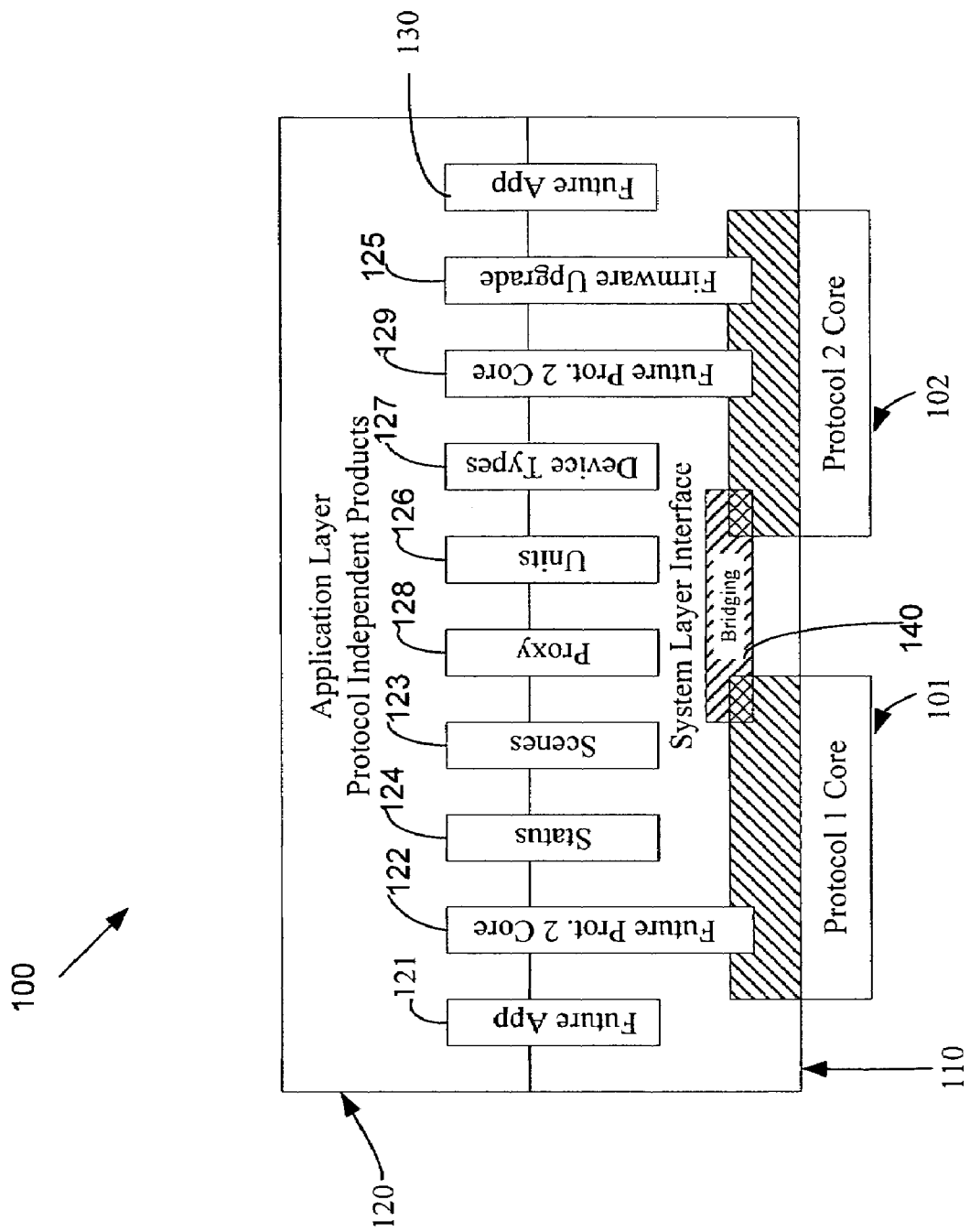
FIG. 1 is block diagram of a network abstraction model depicting a system layer interface.

FIG. 1 illustrates a network abstraction block diagram 100. A network transport layer, such as a first protocol network core 101 or a second protocol network core 102 may reside at the lowest level of the network layers. The network transport layer 101 may include hardware and/or software for implementing network transport functions for the network. The first protocol network core 101 and/or the second protocol network core 102 may provide transparent transfer of data between end users, relieving the upper layers from any concern with providing reliable and cost-effective data transfer. The transport layer controls the reliability of a given link. Some transport protocols may be connection oriented, where the transport layer may track packets and retransmnit those that fail. The first protocol network core 101 and/or the second protocol network core 102 may implement protocols such as the Z-Wave® home automation transport protocol. Other network protocols, such as commercial, industrial, hospital, or home healthcare network protocols may be implemented.

An application layer, such as a protocol independent product 120 may reside at the highest level of the network abstraction layers. The application layer 120 may interface directly to and perform common application services for the application processes. The application services may provide semantic conversion between associated application processes. Examples of applications for a home automation network may include user-selected room environment set-up, text messaging GUI's for the network, scene scheduling, and other GUI-based applications a developer may provide for a network, such as applications for Z-Wave hardware-enabled products using a Z-Wave®-enabled ASIC manufactured by Zensys, from Copenhagen, DK, and for Z-Wave® and protocol independent application layer hardware and/or software enabled products manufactured by Intermatic from Spring Grove, Ill., U.S. A software interface layer, such as the system layer interface 110, resides between the first protocol network core 101 and/or the second protocol network core 102 and the application layer 120 in the network abstraction 100. The system layer interface 110 may provide the library of commands and/or functions to allow developers to create applications that may utilize the first protocol network core 101 and/or the second protocol network core 102 without having to know the protocols for the first protocol network core 101 and/or the second protocol network core 102. The system layer interface 110 may also provide logic and/or libraries to store detailed information and descriptions of devices interfaced to the network underlying the system layer interface 110, which may also allow a developer to create applications without needing to know the network transport layer protocols.

The system layer interface 110 may allow the development of future applications (121 or 130), such as scene setting 123 and status setting 124 in a home automation network 122, firmware upgrades 125, device unit descriptions 126 and/or device type descriptions 127, proxy command functions 128, and core libraries or software upgrades such as core upgrades (122 and 129) for the first protocol network core 101 and the second protocol network core 102, respectively. The system layer interface 110 may provide a software development kit utilizing the libraries of commands and/or functions to generate these new applications and core functions. The system layer interface 110 may also provide command libraries to implement data transfer through bridging 140 between the first protocol network core 101 and the second protocol network core 102, or any other network cores. The system layer can provide this bridging functionality without user intervention or knowledge.

The system layer interface 110 may be encoded in a computer readable medium such as a floppy disk, compact disc (CD), digital versatile disc (DVD), or may be stored in non-volatile memory such as Flash, EPROMs, EEPROMs, MRAM, FRAM, hard disk drive, holographic memory or other solid state memory. The system layer interface 110 may be loaded into a volatile memory such as DRAM or SRAM for execution. The system layer interface 110 may be encoded for transmission in a propagated signal as a series of instructions. The system layer interface 110 may be encoded as logic either as software for execution by a processor or as logic circuits for executing the code comprising the system layer interface 110. The system layer interface 110 may interface with or integrate with an embedded processor, microprocessor, ASIC, memory device, memory controller, and/or other semiconductor devices.

Figure 2:
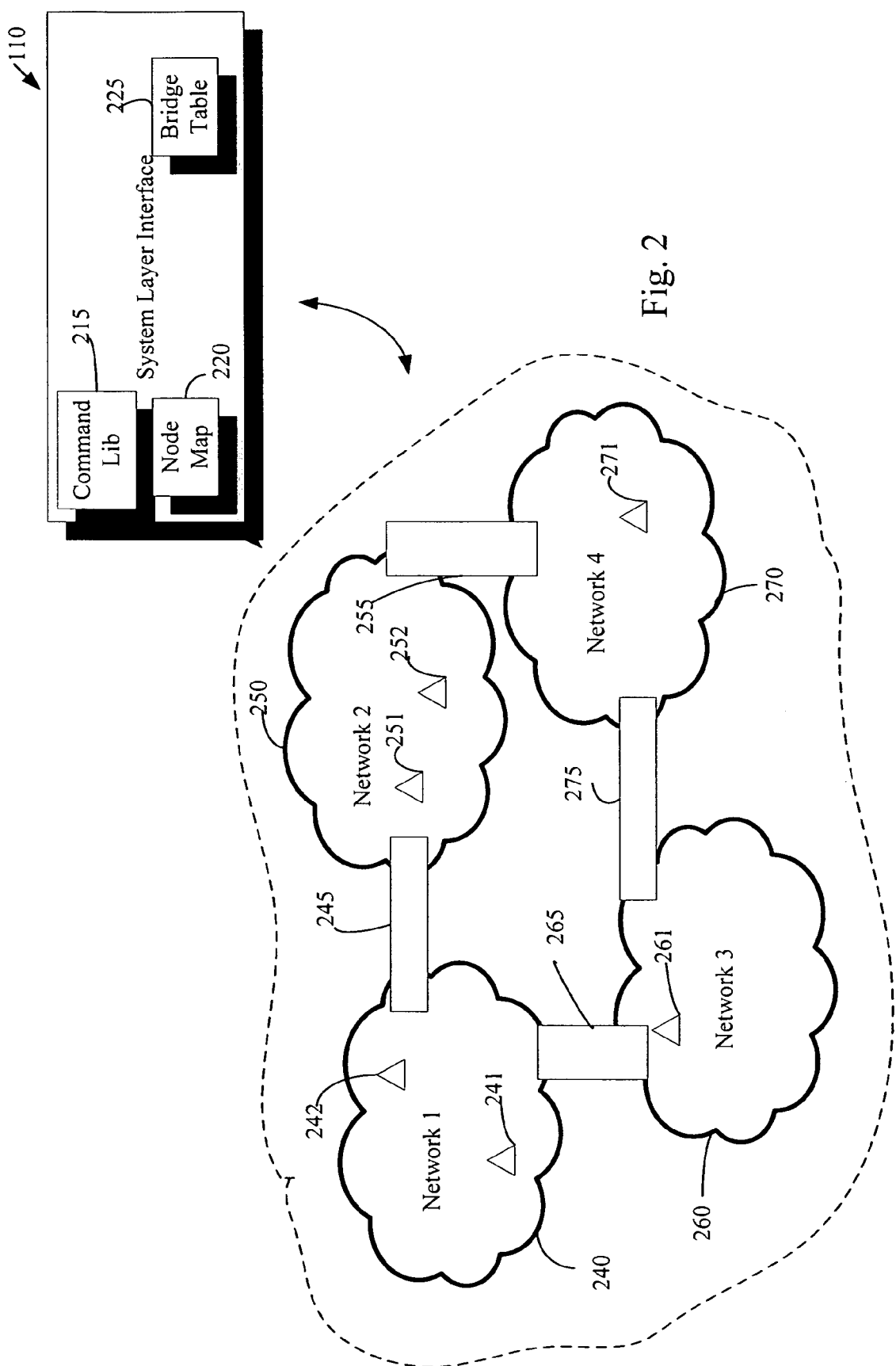
FIG. 2 is a block diagram of a system layer interface and a network system.

FIG. 2 is a block diagram of a system layer interface 110 interfaced with a network system 230. In one embodiment, the system layer interface 110 comprises a protocol-independent application layer. The system layer interface 110 may include a plurality of command libraries 215 that implement the protocol independent application layer. The command libraries 215 may include functions, scripts, application programming interfaces (APIs), and tools that implement network transport layer protocol commands, routing, packetization, data encapsulation, frequency conversion between networks, and/or media access functions.

The system layer interface 110 may be configured to supersede particular network layer protocols. By providing a high-level language to describe underlying network interactions, a programmer may then not need to know the protocols of the networks within the network system 230. The system layer interface 110 provides a protocol-independent abstraction interface to implement the application layer. The system layer interface 110 may provide interfaces to the network transport layer without requiring the developer to understand or work with the network transport layer functionality directly. By providing a library of commands and/or functions for application development related to an underlying network, and by storing detailed information about devices in the network, this abstraction may simplify the network interface and may enable rapid software development for use with the network.

The system layer interface 110 may allow access to the underlying network and hardware, while still maintaining the abstraction. The system layer interface 110 may allow implementation of advanced feature sets that may utilize the hardware directly. The system layer interface 110 may accelerate device implementation and allow core functionality to be added. Examples of software applications that may be developed with the system layer interface may include human readable device description, unit assignment, scene definition and activation for home automation systems, two way status information, system messaging, network room organization for a home automation system, and firmware upgrades.

The system layer interface 10 may be configured to interface with the network system 230 to allow data transfer within the network system 230 and maintain cohesion between the networks. The network system 230 may comprise a plurality of networks 240, 250, 260, and 270 in communication with each other. The networks 240, 250, 260, and 270 may operate with transport protocols different from each other, or they may run the same protocols. For example, network 1 (240) may comprise a home automation network, such as a Z-Wave® network, network 2 (250) may comprise a Zigbee network, network 3 (260) may comprise a TCP/IP network, and network 4 (270) may include a second Z-Wave® network. Other examples of networks include Echelon networks, WiFi networks, Bluetooth networks, WiMax networks, cellular networks such as Global System for Communications (GSM), Code Division Multiple Access (CDMA), Time Division Multiple Access (TDMA), Advanced Mobile Phone Systems (AMPS), point-to-point networks such a Canopy network, microwave-based networks, radio spectrum networks, hospital and home healthcare networks, such Wireless Medical Telemetry Service (WMTS) networks, and other RF and wired networks.

The networks 240, 250, 260, and 270 may include network nodes in communication with the networks. For examples, nodes 241 and 242 may be in communication with network 1 (240), nodes 251 and 252 may be in communication with network 2 (250), node 261 may be in communication with network 3 (260) and node 271 may be in communication with network 4 (270). The nodes 241, 242, 251, 252, 261, and 271 may be coupled wirelessly or through a wired interfaced with each other. Examples of nodes include home or office automation devices, servers, routers, desktop computers, laptop, notebook, or portable computers, personal digital assistants (PDAs), cellular telephones, smart phones, mobile electronic devices, mainframes, network appliances and/or network computers, or other network devices.

The networks 240, 250, 260, and 270 may each include a plurality of connection modules, such as bridges 245, 255, 265 and 275. The bridges 245, 255, 265 and 275 may provide a connection between each of the networks. The bridges 245, 255, 265 and 275 may comprise one-to-one connections between the networks, or may comprise broadcast nodes. Though the bridges illustrated in FIG. 2 show connections between a first network and a second network, other connections between the networks 240, 250, 260, and 270 may be possible. The bridges 245, 255, 265, and 275 are configured to transfer data between the networks using commands, such as transport layer commands. The bridges 245, 255, 265 and 275 may format, convert, or encapsulate the data to transmit the data to another network. The system layer interface 110 may be configured to direct a bridge in transmitting data, without a programmer knowing the transport protocols associated with the bridge or networks. The bridges 245, 255, 265 and 275 may comprise routers, hubs, servers, broadcast devices or other interface modules.

The system layer interface 110 may include a node map 220 and a bridge table 225. The node map 220 may store the list of nodes 241, 242, 245, 251, 252, 255, 261, 265, 271, and 275 interfaced to the network system 230. The system layer interface 110 may use the node map 220 to locate a particular node, a set of nodes, or other combinations of nodes. The bridge table 225 may be configured to store data related to the bridges 245, 255, 265 and 275. The bridge table 225 may retain information related to bridge location, network protocols, transport layer protocols, available transmission inputs and outputs for the bridge, and other network bridge data. The bridge table 225 may be used by the system layer interface 110 to determine a network interface mapping for the nodes.

The system layer interface 110 may be used to route data between nodes. For example, the system layer interface 110 may provide commands and/or applications to route data from node 241 to node 271. The system layer interface 110 may determine locations of node 241 and node 271 retained in the node map 220. The system layer 110 may then determine a sequence or a combination of bridges that may allow data transfer between node 241 and node 271. For example, based on data retained in the bridge table 225, the system layer interface 110 may be used to route data via bridge 245 to bridge 255. As another example, the system layer interface 110 may route data via bridge 265 to bridge 275. The specific way the data is transferred through each protocol is determined by that protocol. Other data routing schemes may be possible. The system layer interface 110 provides the commands and/or instructions to implement the data transfer, including data formatting, conversion, frequency conversion, data encapsulation, encryption, and/or other network transport functions. The abstraction contained in the system layer interface 110 may allow a programmer to develop applications for nodes in the network system 230 without having to know the network protocols of each network. To the programmer, the nodes may all appear functionally to be running a same protocol scheme related to the application interface provided by the system layer interface 110. Using the node table, both products developed with the abstraction layer and without it can be utilized in routing messages as each particular network protocol allows.

The node map 220 and the bridge table 225 may comprise a database, such as a structured query language (SQL) database or other relational database, an ordered list of data structures, a text file, or other data file. The node map 220 and the bridge table 225 may also comprise records, each record containing fields together with a set of operations for searching, sorting, recombining, and other functions. The node map 220 and the bridge table 225 may be stored in a non-volatile memory such as an EPROM, EEPROM, Flash, or other semiconductor and/or solid state memory such as bubble memory, MRAM, FRAM, or holographic memory. The node map may also be stored in a volatile memory, such as a DRAM or SRAM, a removable medium such as a floppy disk, CD, DVD, Syquest, Zip, a hard disk drive, or a magneto-optical drive.

The system layer interface 110 may store detailed information describing devices in a network. Examples of such information include whether the device understands the system layer interface protocol, what commands each device in the network may accept, the battery or power level of each device, whether the device supports messaging, and if so, if scrolling messages are supported and the length of the message supported, as well as the status of the outputs of every device in the network. The system layer interface may provide a central location for defining every scene in a home automation network. This may allow a user of the network to edit scenes for devices with limited user interfaces with those that have complicated graphical user interfaces (GUI's). The system layer interface may be provided through a protocol independent application layer product, network, or software system.

In addition to nodes in a network, nodes that are not "network system"-aware may be brought into the network system 230 when a "network system"-aware node is added into the network system 230. In other words, even though a node doesn't know about the other networks in the network system 230, the network system 230 knows about the node. This allows any network system aware node in the network control and interface with all the nodes in the network system 230.

The system layer interface 110 may be used to manage the connection and interface of nodes added to the network system 110. The system layer interface 110 may update the node map 120 and/or the bridge table 230 to allow the network system 230 to be made aware of the added node.

The present system may allow for a decentralized home, commercial, industrial, hospital, home healthcare, or other automation network with a network abstraction layer that allows for rapid product development and the ability to change the underlying network protocol without massive rewrite of software. The present system may also allow for the ability to upgrade network and application firmware using the network and without a PC.

Networks

Figure 3:
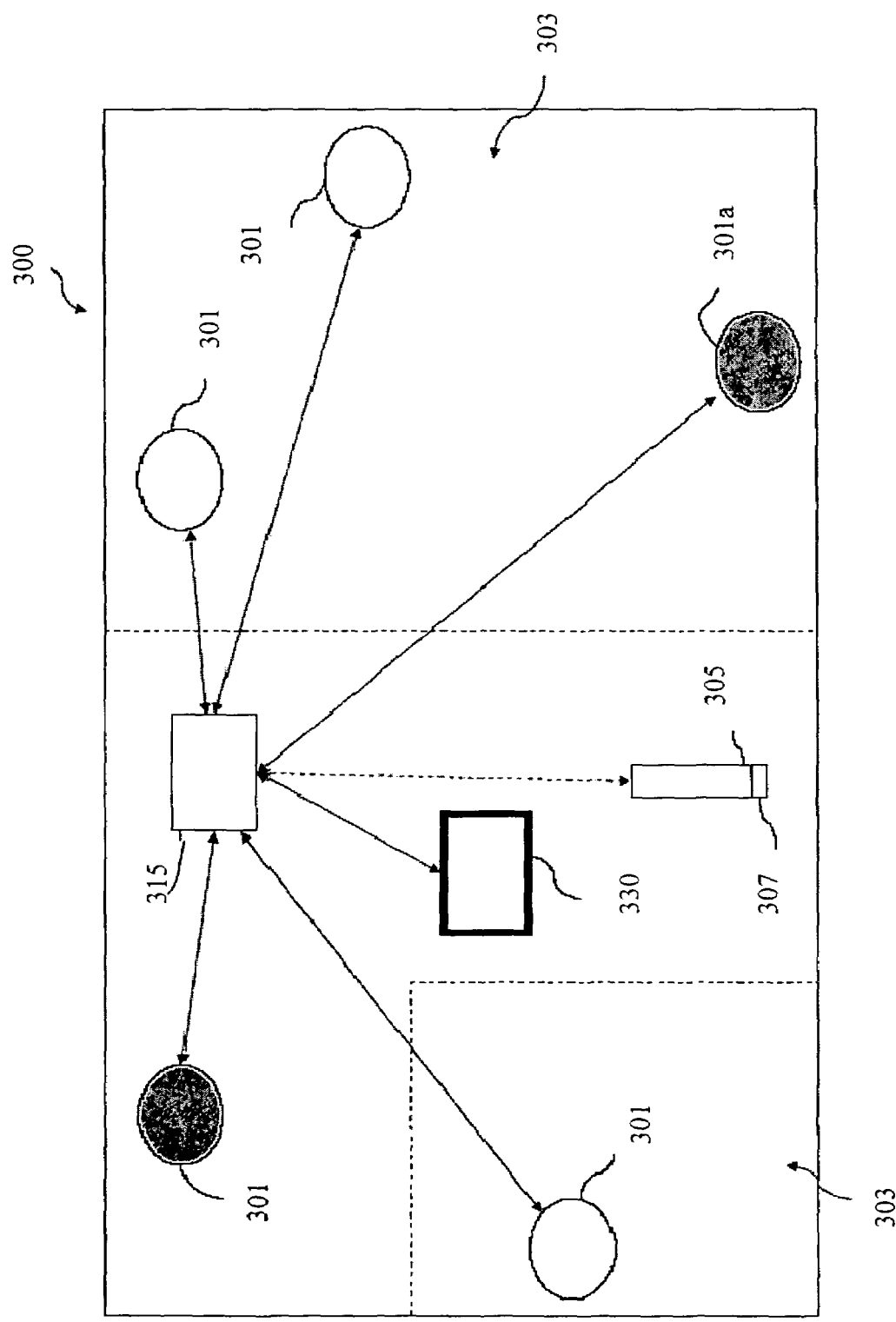
FIG. 3 is a schematic block diagram of a of a home automation network.

The system layer interface may be configured to interface with different types of networks. One example network for which the system layer interface may be suitable is a home automation network. The system layer interface may be configured to interact with other network examples as well. FIG. 3 illustrates a home network environment 300 which may include a number of electrical and electronic appliances, such as lights, controlled by a network of node devices or slave devices 301 and controllers 305. The home network environment 300 may include one or more distinct rooms 302, 303, though these rooms 302, 303 may be joined or portioned as desired. The controllers 305 may activate the slave devices 301 by communicating across the network from room to room. Slave devices 301 and controllers 305 may be powered by battery devices such as standard alkaline battery cells, rechargeable battery cells like NiCd or Li-ion cells, or powered by connection to wall outlets.

The network 300 is configured to route commands and signals between different controllers 305 and slave devices 301 in the network. Communication includes wireless, such as radio frequency (RF), microwave, infrared, or other wireless communication, and/or wired communications. The controllers 305 are devices that may be in communication with the network, and may be activated and manipulated by buttons present on the controller 305. A user may press the buttons on the controllers 305 to send commands to the slave devices 301 in the network to change a state of a component of the slave device 301, such as a relay or triac. The controller 305 may also be activated in other ways, such as by voice. Since the slave device 301 may supply power to the electrical or electronic appliance, a change in state of the component of the slave device 301 may in turn change the state of the electrical or electronic appliances.

Libraries

The system layer interface 110 may provide a library of functions to implement commands. The commands may be used to interface with the underlying network transport layer. The interface may provide commands for a user interface to the hardware of the network and commands to implement network structure. User defined commands may include the implementation of the slave devices described above, user interfaces, scene activation, scene dimming, and status. Examples of network structure commands include starting network activity, adding or removing devices, setting up routing between devices, and identifying devices. The system layer interface 110 may also provide functions for passing information from the network to a user, such as request functions, interpretation function, and indicator commands for the devices. The system layer interface 110 may also include links, references or pointers to the command libraries. The command libraries may be linked to the system layer interface 110 at compilation, during run-time, or may be integrated with the system layer interface 110. The command libraries may comprise dynamic link libraries (DLLs) or static libraries.

Device Types

Figure 4:
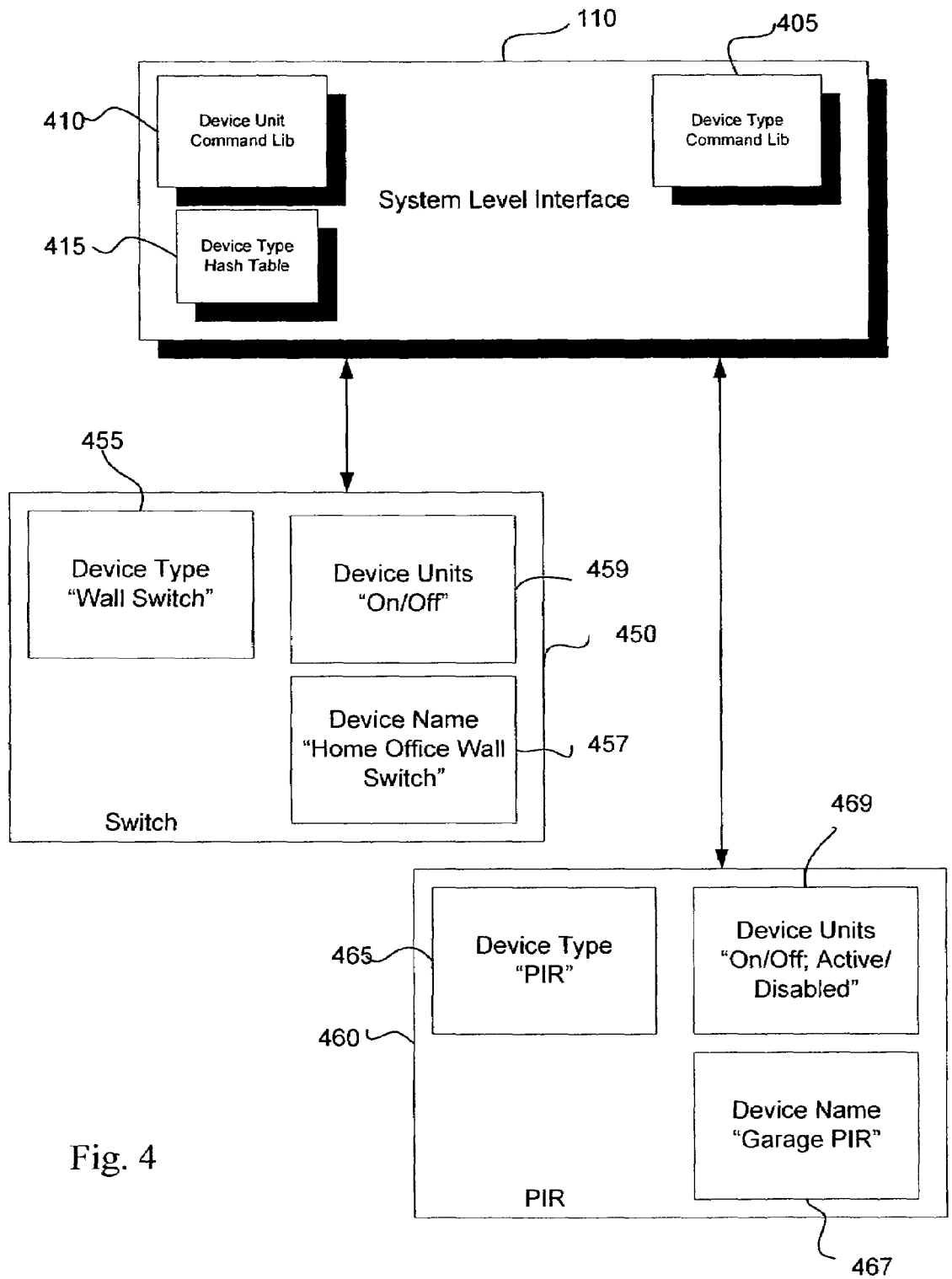
FIG. 4 is a schematic block diagram of a software architecture for device types and device units for a home automation network.

FIG. 4 illustrates a software architecture that implements device types and units for a home automation unit. The system layer interface 110 may provide a process to enhance the identification of device in an underlying network, such as a home automation network. The interface 110 may provide command libraries, such as a device type command library 405 and a device unit command library 410, to allow adding a "human readable" device type or description and units as an additional layer of description for the network description for each device. Typically, switches in a home automation network may be binary switches, such as an on/off light switch or other power switch. The interface 110 may provide text and/or alphanumeric descriptions of the switch. The device types may be centrally controlled, updated, maintained, and controlled in the network 300. For example, a switch 450 on the wall may be provided, by the system layer interface 110, with a device type 455 or description such as "wall switch," or "dimmer." A home security PIR 460 may be provided with a device type 465 of a "PIR." Other examples of "human readable" device descriptions include thermostats, PIRs, garage door openers, outdoor flood lights, light, temperature, sound, and humidity sensors, and other devices associated with a home automation network. The list of devices is not limited to those associated with a home automation network, as the "human readable" device description may be implemented by the system layer interface 110 for other types of networks as well.

A "human readable" device name may be implemented by the system layer interface 110. The device name may be a specific instance of a device type, and may be changed dynamically. For example, the switch 450, which may be located in a home office, may be designated with a device name 457 of "Home Office Wall Switch." The PIR 460, which may be located at a garage, may be designated with a device name 467 of "Garage PIR." The device names may be controlled within the network 300, and may be locally updated or maintained. The "human readable" device descriptions may be associated with a hash table of values 415 so that a value, such as a single byte value, may identify a device. This value may be transmitted in packets of data between devices, such as between a switch in a home automation network and a controller with a display outputting the device description. The "human readable" device description may provide more information than the information provided by the network transport layer, so a user of the network will not need to be familiar with the transport protocol and/or identification scheme of the network devices. This is an additional advantage of the abstraction provided by the system layer interface 110.

The list of strings of "human readable" text for the descriptions may be stored in each of the devices to be identified. The list of strings may be stored in a non-volatile memory such as an EPROM, EEPROM, Flash, or other semiconductor and/or solid state memory such as bubble memory, MRAM, FRAM, or holographic memory. The list of strings may also be stored in a volatile memory, such as a DRAM or SRAM, a removable medium such as a floppy disk, CD, DVD, Syquest, Zip, a hard disk drive, or a magneto-optical drive. The memory may be resident in the network 300 or may be remotely located or in communication with the network 300.

Devices to be included in the network may be programmed with an updated list before installed in the network. If the known devices in the network encounter a device that has an unknown device type, the known devices ask the unknown device for the unknown device text description (i.e., the "human readable" description) and may add this text description to the known devices stored list of description strings. The device type descriptions may be controlled centrally and one device type ID may correspond to one device type description. Therefore, new descriptions may only need to be handled once when encountered by the network.

Device Units

The system layer interface 110 may also provide a process to implement "human readable" units. "Human readable" units may provide an interface for a device status. Units may be similar to device types, and may be associated with a hash table comprising single alphanumeric values associated the "human readable" units. "Human readable" units may provide enhanced descriptions for device status. A binary switch, such as a light switch, has a single binary output, or device unit 459 of either "ON" or "OFF." A passive infrared sensor (PIR) sensor may have two binary outputs—one to arm or disarm the sensor, and a second for a switch. If only two labels are available for the PIR, such as "ON/OFF" may be confusing. The system layer interface 110 may provide a process to add additional status labels for enhanced description of the device status. With the PIR, the interface 110 may provide device units 469 or labels such as "ON/OFF" for the switch and "ACTIVE/DISABLED" for the sensor. The user may then be able to distinguish the different states of the PIR.

A further example of a device that may use "human readable" units provided by the system layer interface 110 is a fan controller. If the fan controller has three speeds, such as low, medium, and high, the device status may be encoded with a string providing information about these states. The string may be organized so that the first character of the string may specify the maximum value of the device status for a particular level (such as 0-33 as the range for low). The next character may describe the status (such as low, medium, or high). The strings may be null-terminated. In the fan controller example, any first character reading between 0 to 33 corresponds to a low status, a reading between 34 to 66 corresponds to a medium status, and a reading between 67 to 99 may correspond to a high status. The "human readable" units for a device status may be parsed into any number of states (i.e. 5 levels, 50 levels, etc). With the system layer interface 110 providing "human readable" units for the devices, the network may not need to develop new protocols for each of these device status levels.

Figure 5:
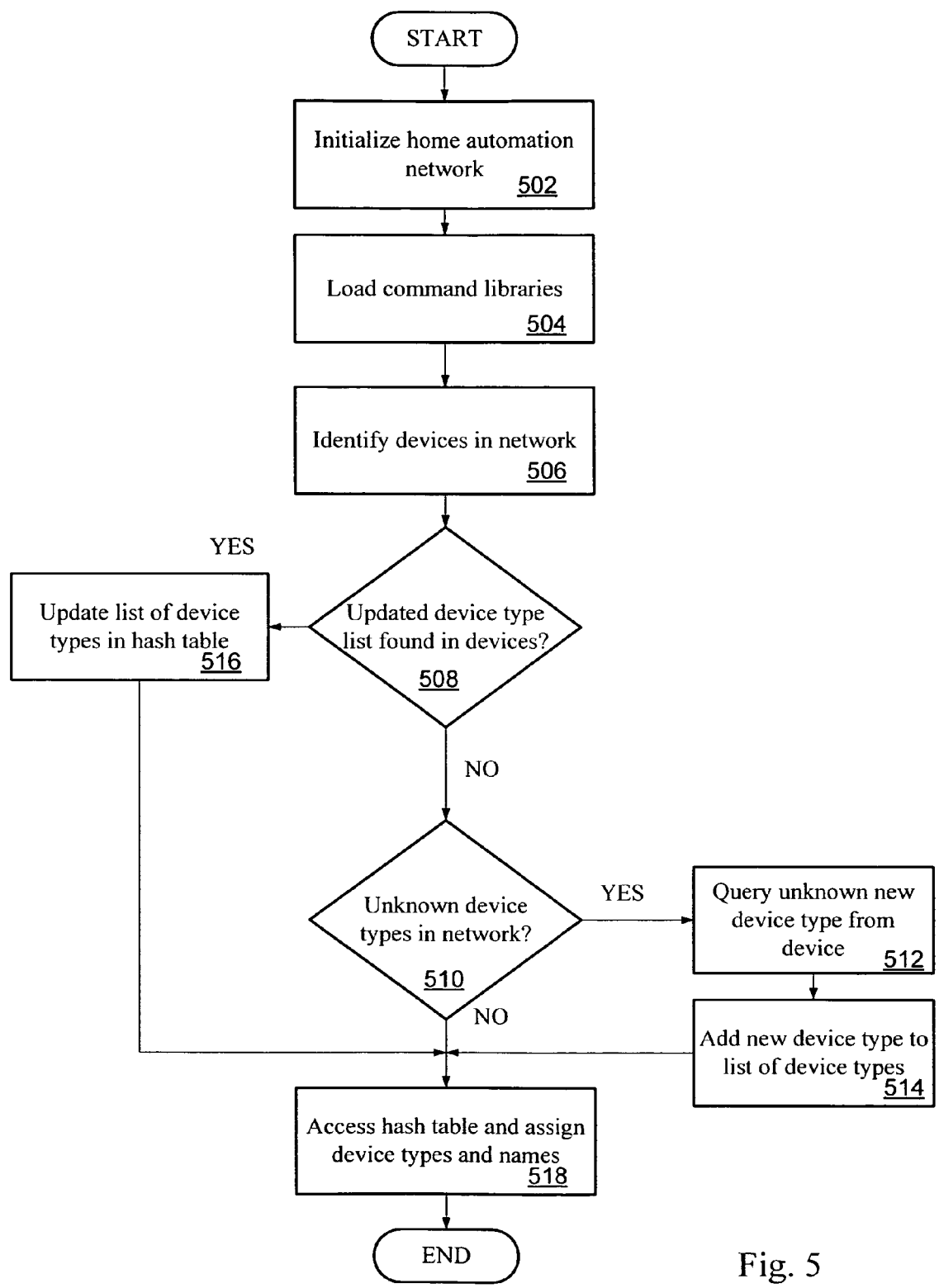
FIG. 5 illustrates an example process that implements device types and units for a home automation network.

FIG. 5 illustrates example acts in a process that implements human-readable device types and units. The network 300 initializes, at act 502. The network 300 may perform start-up routines and boot checks, determine communication standards and operability, and load files for operation. The network 300 loads command libraries, such as command libraries that implement functions for human-readable device types and units, at act 504. The network 300 may determine a list of device types or device units, such as human-readable device types and human-readable device units. The network 300 may access databases or files retained in storage units in communication with the network 300. The network 300 may also access storage units that are remote from the network 300, such as storage units in other network domains or different network types, such as non-home automation networks.

The network 300 identifies network devices in communication with the network 300, at act 506. The network 300 may query the network devices in serial, or in parallel. In some exemplary embodiments, the network 300 may receive a transmission from each of the network devices indicating their presence. The network 300 determines, at act 508, if an updated list of human-readable device types or units is found in one or more of the network devices identified in act 506. The network 300 may compare the updated list from the list determined at act 504.

If the network 300 determines that there is not an updated list of device types or units, the network 300 determines, at act 510, if there are unknown device types in the network devices identified. When the network 300 determines there are unknown device types, the network 300 queries the unknown new device type from a network device, at act 512. The network 300 may determine the string properties, such as length, whether the string is text or alphanumeric, and whether it is null-terminated. The network 300 adds the new device type to the list of human-readable device types, at act 514.

If the network 300 determines, at act 508, that there is an updated list of human-readable device types, the network 300 updates the list of human-readable device types stored in the hash table, at act 516. The network 300 may replace the original hash table with an updated hash table, or the network 300 may add entries or update entries in the hash table. The network 300 may transmit the updated list to the network devices, or to other network nodes coupled to the network 300. The network 300 may back-up or perform error checking on the updated hash table to ensure data consistency.

After the list of human-readable device types is updated, or when the network 300 determines that there are no unknown device types in the network devices, or after the new device type has been added to the list of device types, the network 300 accesses the hash table and assigns human-readable device types and names to the network devices, at act 518. The network 300 may perform other acts in addition to the process described in FIG. 5, such as data transport, scene setting, or other network operations.

Room Organization

The system layer interface 110 may provide a process for categorizing network devices into logical groupings. A network that contains a series of devices may be organized as appropriate based on the user's desired structuring. For example, an office may comprise a series of devices such as personal computers, printers, scanners, copiers, fax machines, laptops, wireless devices, and other electronic devices. An office manager may desire to organize the electronic office devices into functional groups, such as those devices used by the accounting, marketing and legal department. As another example, a home automation network may comprise devices, controllers, and servers associated with particular rooms in a house or property environment. A user may want to group the devices based on rooms, or buildings, if multiple buildings are present on the property. The interface 110 may provide a method to implement a room organization. Like device types and units, rooms may be based on a hash table. The interface 110 may generate a hash table associating an identifier, such as one or more alphanumeric characters, with a logical grouping such as a room, office area, or functional unit. The interface 110 may then assign selected devices the logical grouping identifier within the hash table. Each network may have its own list of logical groupings created through a GUI or other user interface.

Proxy Commands and Devices

The system layer interface 110 may implement proxy commands and proxy devices. A proxy device is a device designated by the system layer interface 110 to accept commands and/or messages to be relayed or transmitted through another medium to another device. The medium may run a protocol different from the protocol that the proxy device or other network devices may be running. In a home automation network, the use of proxy commands by the system layer interface 110 may enable battery-powered devices, not actively communicating with the network, to receive application layer commands through a listening device designated as a proxy by the interface. For example, a home automation network may provide a handheld remote that may be placed in a base charger.

The handheld may request, through the serial connection between the handheld remote and the base charger, that the base charger be designated a proxy device for the handheld remote. The base charger informs the system layer interface 110 through a data packet that the base charger is now the proxy device for that handheld remote. Information and/or commands that the network may transmit to the handheld remote may be sent to the base charger which then passes the commands through the serial connection to the handheld remote. This allows a handheld which is not actively in network to conserve battery and so may be seen as static device and updated in real time.

The system layer interface 110 may facilitate interaction between different protocols, even if the protocols operate on different media.

The system layer interface 110 provides proxy commands to implement proxy device organization. Proxy Commands may be used to pass commands from one device to another through an alternate media, like a serial port. A Proxy Request Command packet, illustrated below, may be used to send a request for any destinations for whom the recipient is a proxy.

| PROXY REQUEST |
|---|

A Proxy Assign Command, illustrated below, may reroute commands for another node through the sender.

| PROXY ASSIGN |
|---|
| Target Node ID |

The Target Node ID (8 bit) indicates the Node whose commands are rerouted.

A Proxy Assignment Command may report whose commands the recipient is proxy for.

| PROXY ASSIGNMENT |
|---|
| Target Node ID |

The Target Node ID (8 bit) indicates the Node for whom the recipient is proxy.

A Proxy command, illustrated below, may send a command to another node.

| PROXY |
|---|
| Target Node ID |
| Embedded Command |

The Target Node ID (8 bit) indicates the eventual destination of the command.

An Embedded Command packet indicates the encapsulated command to deliver to the destination.

Figure 6:
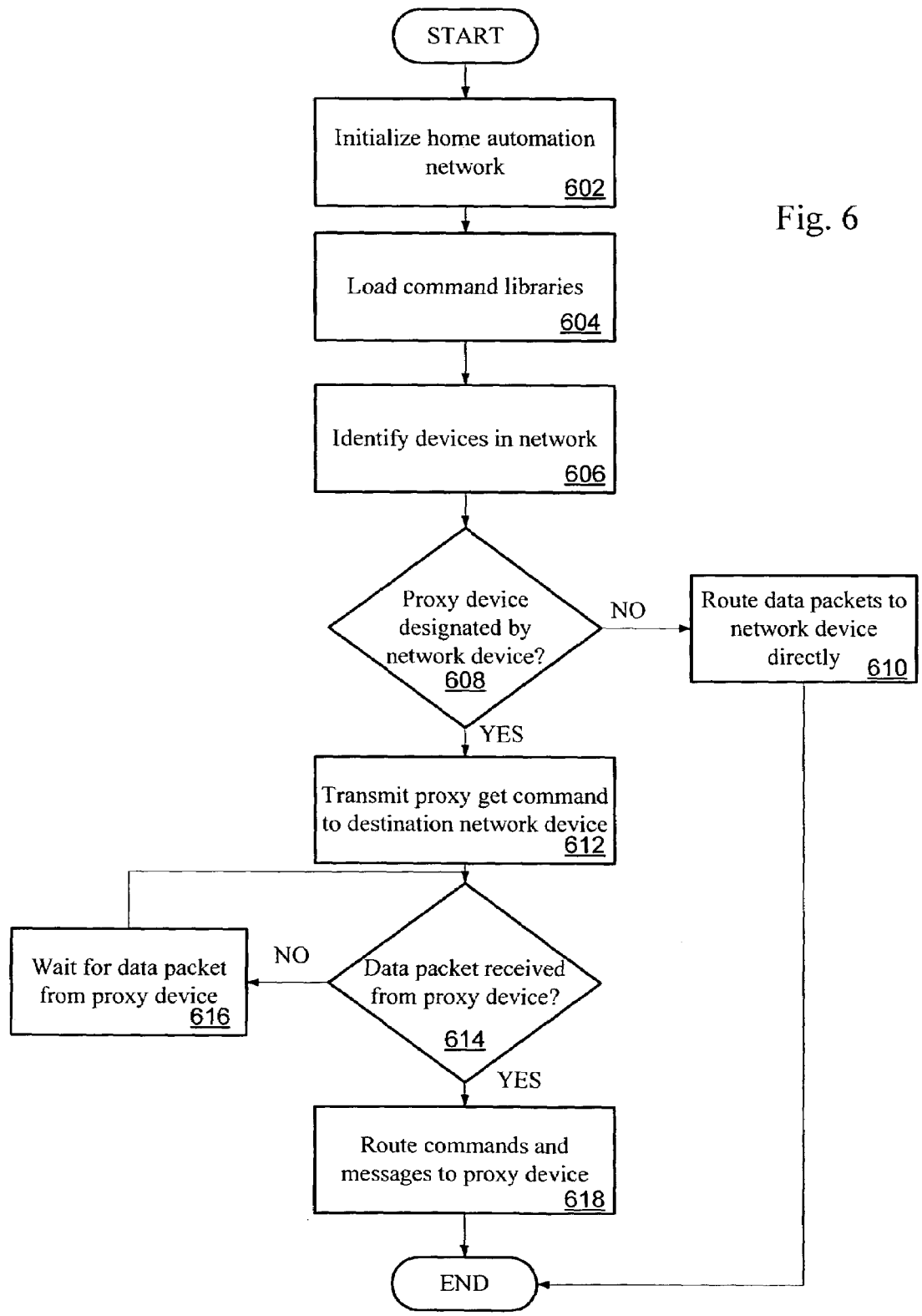
FIG. 6 illustrates an example process that organizes a home automation network using proxy commands and proxy devices.

FIG. 6 illustrates a process that organizes a home automation network using proxy commands and proxy devices. The network 300 initializes, at act 602. The network 300 may perform start-up routines and boot checks, determine communication standards and operability, and load files for operation. The network 300 loads command libraries, such as command libraries that implement functions for proxy commands and proxy device designations, at act 604. The network 300 may access databases or files retained in storage units in communication with the network 300. The network 300 may also access storage units that are remote from the network 300, such as storage units in other network domains or different network types, such as non-home automation networks.

The network 300 identifies network devices in communication with the network 300, at act 606. The network 300 may query the network devices in serial, or in parallel. In some exemplary embodiments, the network 300 may receive a transmission from each of the network devices indicating their presence.

The network 300 determines if a proxy device is designated by a network device, at act 608. For example, a handheld remote associated with a battery charger base may designate the battery charger to be the proxy device associated with the handheld remote. The handheld remote may communicate with the battery charger using a serial connection. The handheld may request, through the serial connection between the handheld remote and the base charger, that the base charger be designated a proxy device for the handheld remote. The base charger informs the system layer interface 110 through a data packet that the base charger is now the proxy device for that handheld remote.

If the network 300 determines that there are no proxy devices in the network 300, the network may route data packets, such as commands or messages, to a network device directly, at act 610. If, in contrast, the network 300 determines that a proxy device has been designated, the network 300 may transmit a proxy get command to the destination network device, to which data packets are to be sent, at act 612. The network 300 determines if a data packet is received from the proxy device, at act 614, indicating that the proxy device is ready to accept commands or messages on behalf of the associated network device. If the data packet is not received, the network 300 may wait for the data packet, at act 616. If the data packet is received from the proxy device, the network 300 routes commands and/or messages to the network device via the proxy device, at act 618. Using the example above, information and/or commands that the network 300 may transmit to the handheld remote may be sent to the base charger which then passes the commands through the serial connection to the handheld remote. Other network devices may be used, as well as designated as proxy devices. The network device may communicate with the proxy device through a wired or wireless connection. Examples of wired connections include coaxial, RCA, twisted pair, USB, Firewire, and other wired connections. Examples of wireless connections include Bluetooth, WiFi, Zigbee, cellular, infrared (IrDa), WiMax, microwave, and satellite transmissions.

Application Updates

The system layer interface 110 may be used to implement methods for transferring large amounts of data around an underlying network. The method utilizes the transport layer of the base underlying network. The method may be used to transmit GUI updates, application updates, application enhancements, network updates, or any other large information packets required for transmission between devices. These updates may originate within the underlying network, or from a source external to the underlying network. Updates may be distributed through the Internet, compact disc (CD) releases, wired or wireless interfaces to the network, or through devices, installed in the network, that are configured to update other devices in the network.

The system layer interface 110 may be utilized to generate installer software code equipped with a current copy of software to be utilized by or on the network. After installation of the network and/or network devices, the installer software code may update devices on the network to ensure the devices have the latest software. Existing device GUI's may be updated when new software is provided with new devices installed in the network. Application programmers may utilize the system layer interface 110 to develop applications that interface or function in or on the network. These applications may be distributed through the Internet, through a wired or wireless interface to the network, or as software or firmware installed on devices that may interface 110 with the network.

The system layer interface 110 may provide commands to implement the upgrade process. A command may be sent along with a data transfer command. Examples of commands include request and data commands. A request command may be used to request the next packet to be sent across the network. A data command may be used to program the firmware or software of a target device. Examples of data transfer commands include firmware upgrade commands, software upgrade commands, and bulk data commands. These commands may specify what type of data is to be processed.

The commands for data transfer may be configured as packets with a number of byte-length identifying fields. Examples of identifying fields may include the data transfer command type, the identification of the device to be upgraded, identifier fields for the next packets to be processed (such as an index of the packet requested and used for addressing), error checking fields comprising data used for error checking, data type fields (used when bulk data is transferred in the network), and payload fields (comprising the firmware, software, or bulk data to be programmed or transferred).

Figure 7:
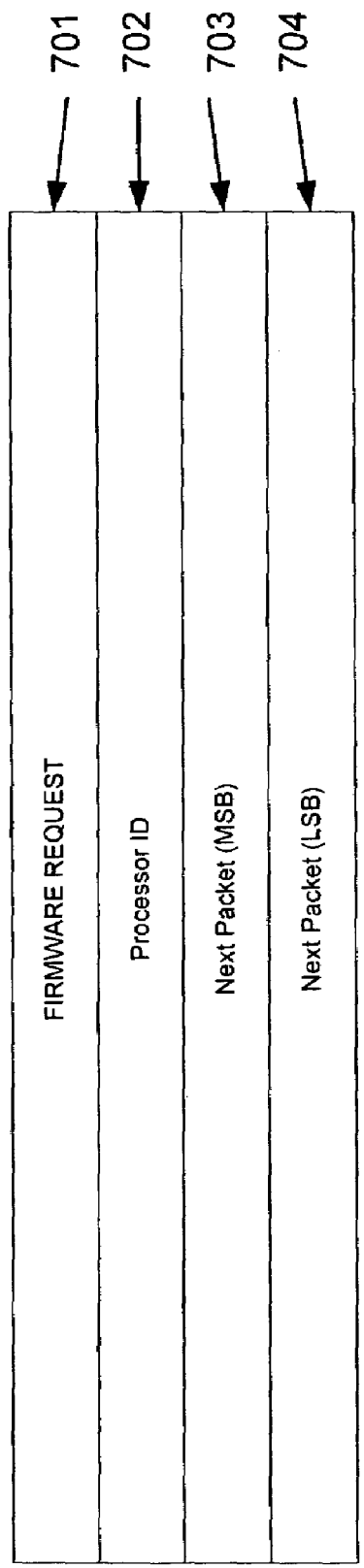
FIG. 7 is an example command packet for a firmware request command.

FIG. 7 illustrates an example Firmware Request command packet. The first byte 701 identifies the data transfer command, "firmware request" in this example. The second byte 702 identifies the processor for the device that is to be upgraded. The third byte 703 identifies the most significant byte index of the packet requested, which may also be used for addressing. The fourth byte 704 identifies the least significant byte for the index of the packet requested. This may also be used for addressing.

Figure 8:
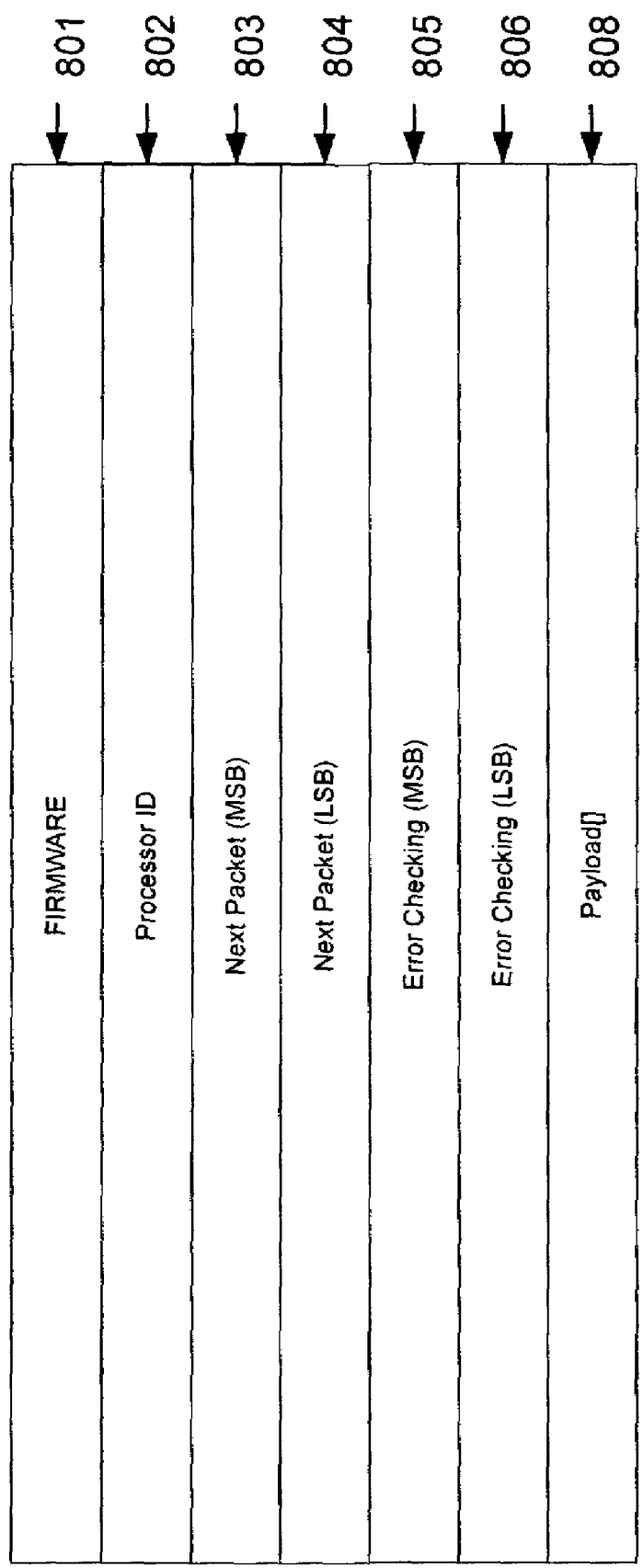
FIG. 8 is an example command packet for a firmware command.

FIG. 8 illustrates an example Firmware command packet, which may be used to program the firmware of a target device. The Firmware command packet has a different first byte 801 from the Firmware Request command, in that the first byte identifies a data command. There are three additional fields in the data command. These may include two byte fields (805 and 806) comprising data used for error checking, identified by the least significant byte and most significant byte of the error checking data word. The seventh byte 807 in the data command packet identifies the payload, comprising the firmware to be programmed in the device. The payload may comprise more than one byte, so the seventh byte field may extend for one or more bytes.

Figure 9:
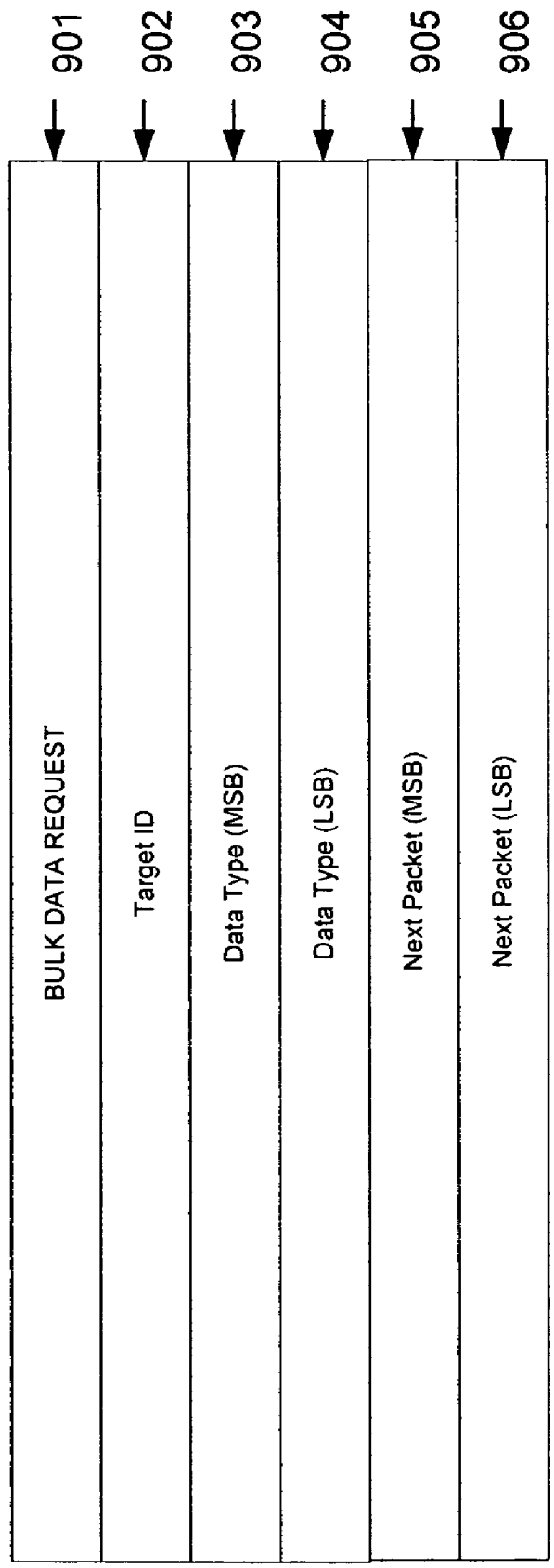
FIG. 9 is an example command packet for a bulk data request command.

FIG. 9 illustrates an example Bulk request command packet, which may be used to pass miscellaneous bulk data through the network. The Bulk request command packet may comprise six bytes of data. The first byte 901 identifies the data transfer command, Bulk Request in this example. The second byte 902 identifies the target in the device to receive the bulk data. The third byte 903 identifies the most significant byte of the word comprising the type of bulk data. The fourth byte 904 identifies the least significant byte of the word comprising the type of bulk data. The fifth byte 905 identifies the most significant byte of the word comprising the index of the packet requested. The sixth byte 906 identifies the least significant byte of the word comprising the index of the packet requested.

Figure 10:
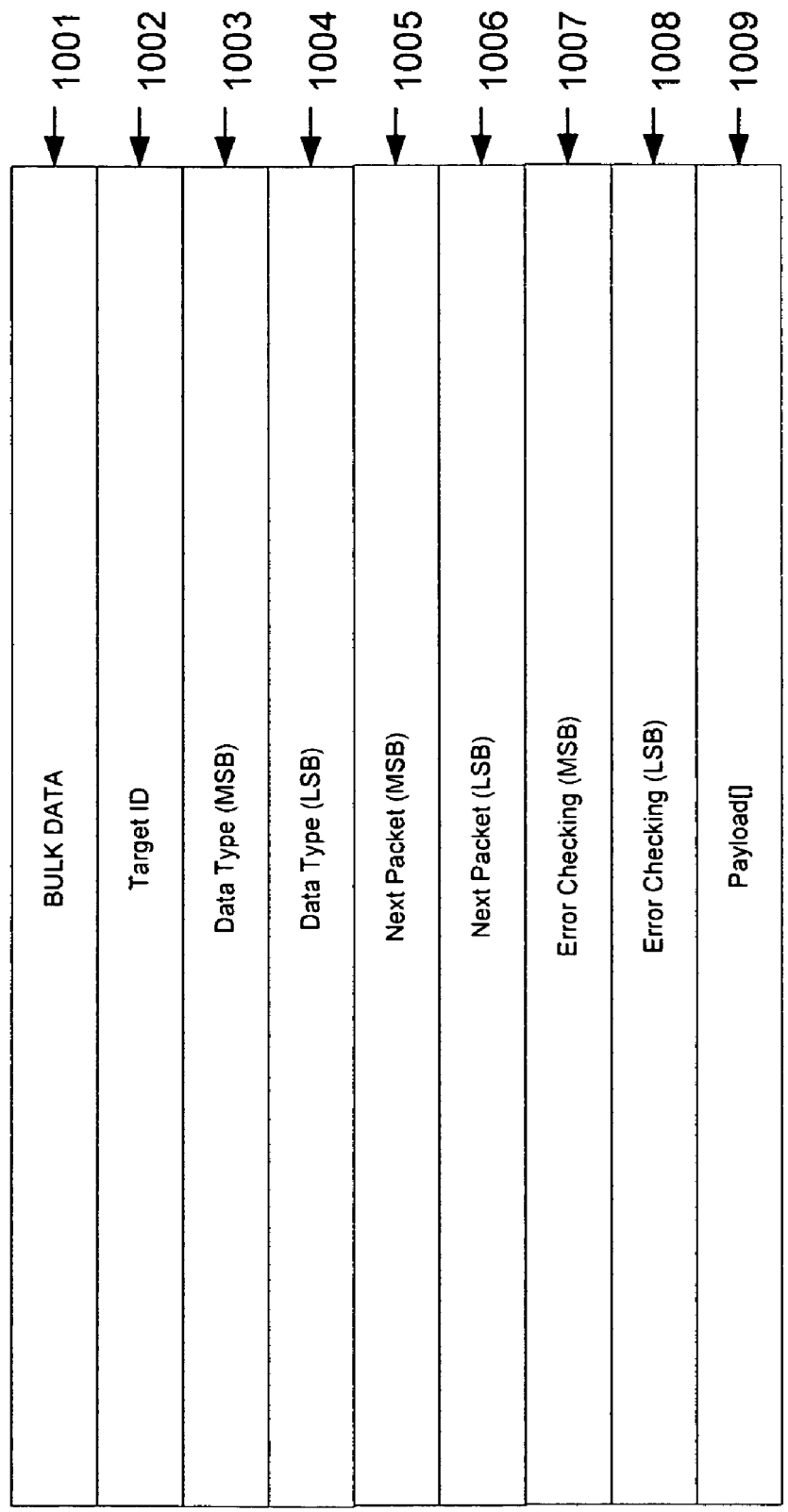
FIG. 10 is an example command packet for a bulk data command.

FIG. 10 illustrates an example Bulk data command packet, which may be used to process or program the bulk data at the target processor of the intended device. The data command packet may include nine byte-length field identifiers. The second through sixth bytes (1002-1006) are the same as the field identifiers in the Bulk request command packet. The seventh byte 1007 identifies the most significant byte of the word comprising the data used for error checking. The eighth byte 1008 identifies the least significant byte of the word comprising the data used for error checking. The ninth byte 1009 identifies the beginning of the payload, which comprises the bulk data to be programmed or processed at the target processor. The payload may comprise more than one byte, so the eleventh byte field may extend for one or more bytes.

Figure 11:
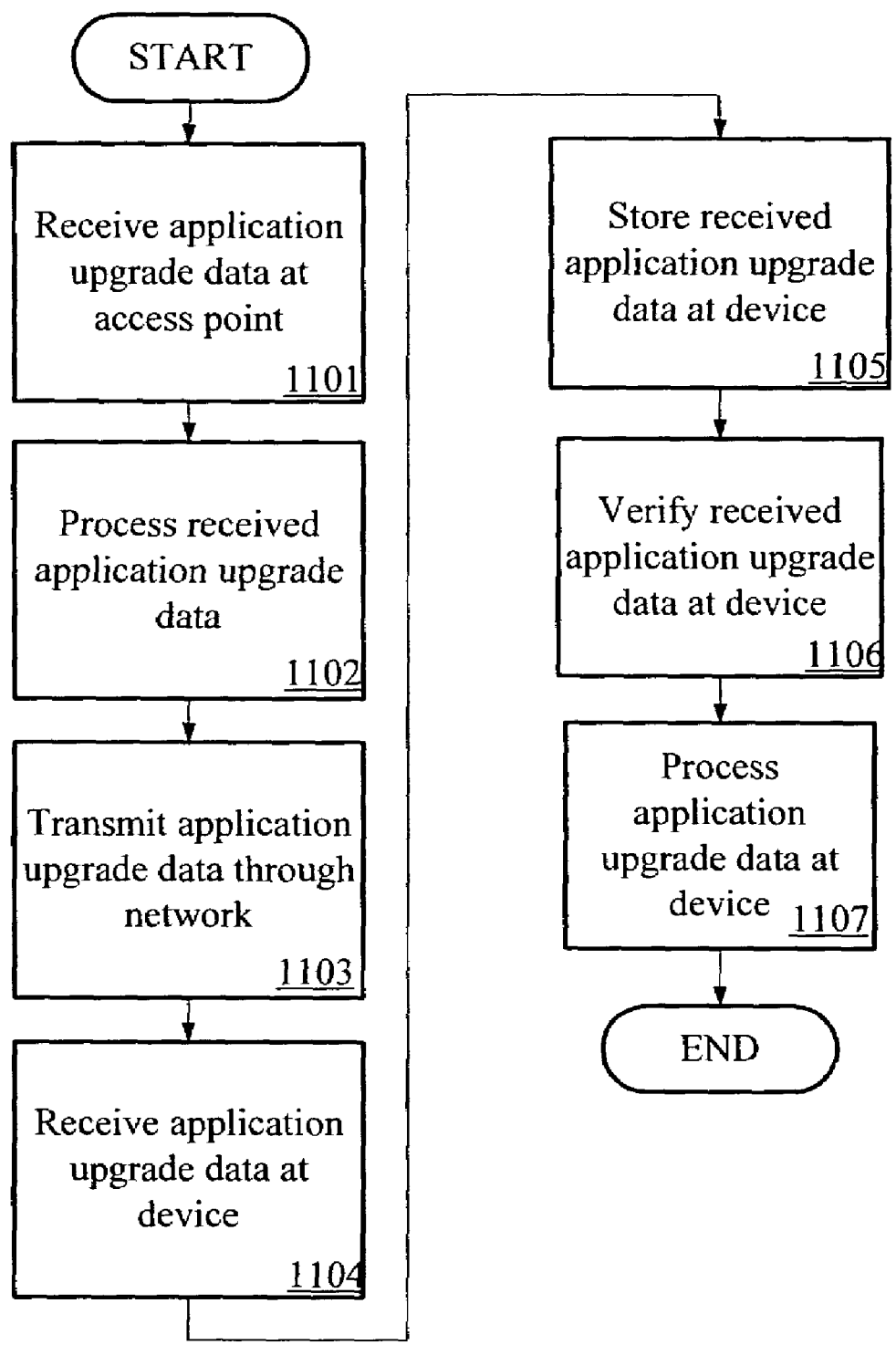
FIG. 11 is a process for updating application data in a network.

FIG. 11 illustrates a method for upgrading applications, such as firmware, on a device in a network. The system layer interface 110 may provide functions and/or commands to implement the method, such as the request and data commands described above. The source of the application upgrade may be provided remotely, such as over a network, wireless interface, or other interconnecting medium that may be running a different protocol for that run by the network containing the device to upgrade. The system layer interface 110 may provide commands to implement a request and transfer for application data. The method may receive data associated with the application upgrade at an access point in the network, at act 1101. The access point may be a USB port, serial port, wireless interface, USB drive, network bridge, or other wireless or wired sources of data input to the network. The access point may be a node or bridge node connected to the network as well. At the access point of the network, the network 300 may process the received application upgrade information, at act 1102. Examples of processing include packetization of the data, integrity, and error checks on the data. The network 300 may transmit the processed application upgrade data through the underlying network 300, at act 1103.

The device may request a next packet to be transmitted across the network 300, using a request command. The request command may be transmitted initially to start the application upgrade process. The request command may be sent after the initial packets of data related to the application upgrade data are received at the device.

The transmission may be accomplished by the transport layer functions provided by the underlying network 300. The system layer interface 110 may also be used to coordinate or implement functions for the transmission. The processed data is received by the device intended for upgrade, at act 1104. The intended device may then store the received data, at act 1105, in a memory such as a non-volatile flash memory, EPROM, EEPROM, or other semiconductor or solid state memory. The device may then verify the received data, such as by performing a checksum or other integrity check on the data, at act 1106. The device may process the application upgrade data, at act 1107. A data command may be used to program the firmware or software of a target device. The data command may be transmitted along with the application upgrade data, or may be separately transmitted.

The device may reprogram or upgrade its firmware or other applications based on the received firmware upgrade data. Auxiliary processors in the device, or auxiliary processors interfaced to devices within the network 300, may also be reprogrammed or upgraded.

Messaging

The system layer interface 110 may be utilized to develop messaging applications. Messaging may be implemented as process for transmitting packets of data comprising human-understandable information (e.g. audio, speech, tactile) from one node in the network to another node in the network. The packets of data include postable, user-readable data. The messages may include character or alphanumeric strings. Examples of messages include the states of devices connected to the network, scene information from a home automation network, alarms, alerts, and scheduled events that may be reported. A device in the network that supports messaging may pass a message to a message output device, such as an LCD-equipped switch, controller, monitor, or remote, for example. Other output devices include a speaker, a Braille terminal, haptic interfaces, force-feedback interfaces, text message devices, or other human-understandable output devices.

Figure 12:
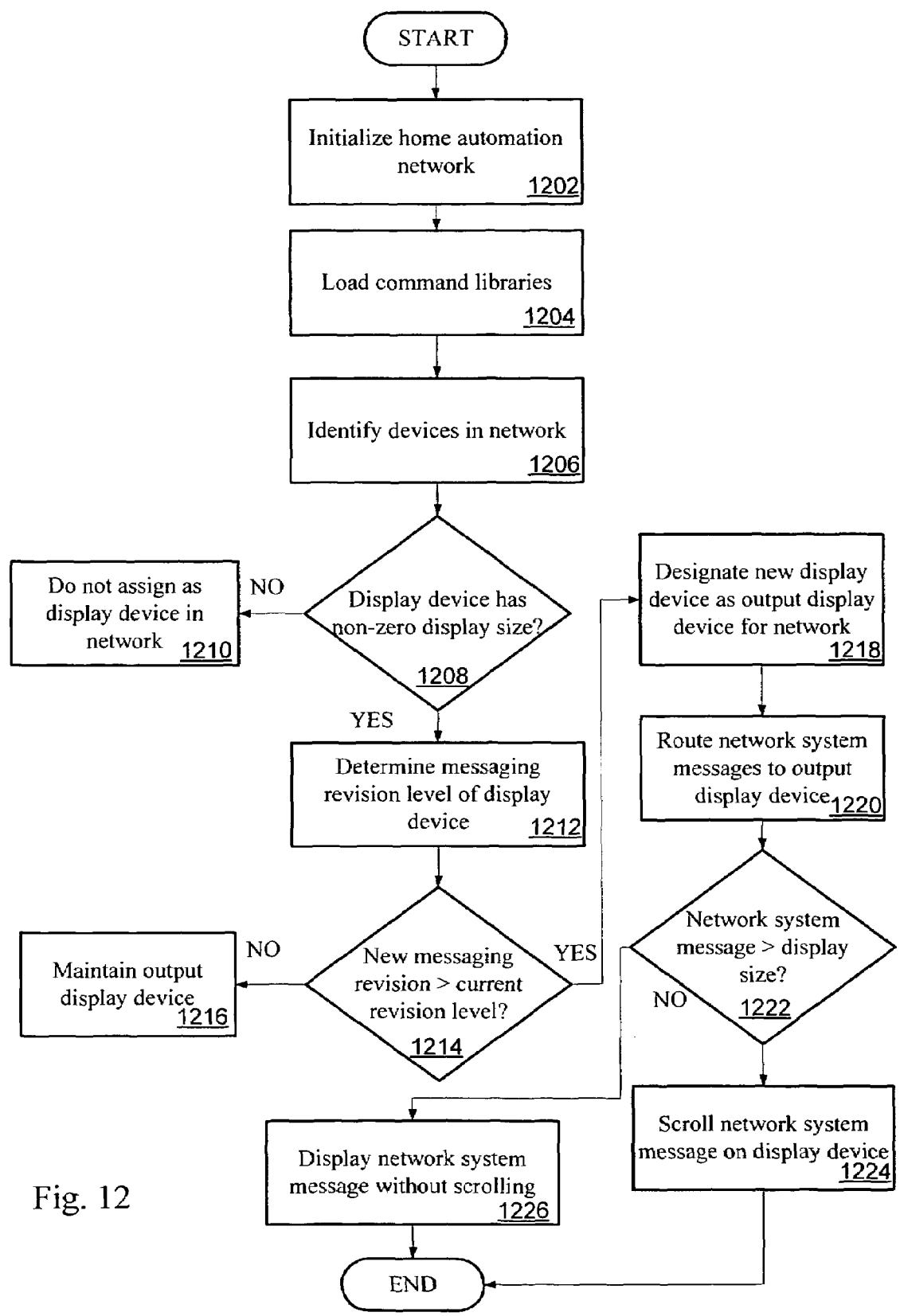
FIG. 12 is a process that implements messaging in a home automation network.

FIG. 12 illustrates a process that implement messaging in the home automation network 300. The system layer interface 110 may include command libraries to allow updates of the status of message display devices as they are added to the network. Message display devices may include a messaging revision level indicating the currency of the software and/or firmware included with the message display device. The network 300 initializes, at act 1202. The network 300 may perform start-up routines and boot checks, determine communication standards and operability, and load files for operation. The network 300 loads command libraries, such as command libraries that implement functions for proxy commands and proxy device designations, at act 1204. The network 300 may access databases or files retained in storage units in communication with the network 300. The network 300 may also access storage units that are remote from the network 300, such as storage units in other network domains or different network types, such as non-home automation networks.

The network 300 identifies network devices in communication with the network 300, at act 1206. The network 300 may query the network devices in serial, or in parallel. In some exemplary embodiments, the network 300 may receive a transmission from each of the network devices indicating their presence. The network 300 determines, at act 1208, whether the message display device has a non-zero messaging display size. If the message display device does not have non-zero display size, the network 300 does not designate the device as an output display device that may be used by the network 300. The message display device may be assigned by the network when a device is included or installed in the network and when the display device has a non-zero messaging display size. The network 300 determines a new message display device messaging revision level of the message display device, at act 1212. When a message display device is added to the network, the network 300 compares the new message display device messaging revision level with the most current messaging revision level stored in the network, at act 1214. If the new message display device messaging revision level is not current than the existing network stored revision level, the network 300 maintains the current output display device, at act 1216. If the new message display device messaging revision level is more current than the existing network stored revision level, the new message display device is designated as the output for network system messages to be displayed, at act 1218, and the currently designated messaging display device is de-designated as the messaging display device. The network 300 routes network system messages to be displayed to the output display device, at act 1220.

The network 300 determines, at act 1222, if the message to be displayed is too long for the message display device to display, such as if the string length of the network system message is longer than the display size of the output display device. If the network system message is too long, the message may be scrolled, at act 1224. Otherwise, the output display device may display the network system message without scrolling, at act 1226. If the message is too long for device's memory, the message may be truncated and an ellipsis ( . . . ) may be added to the end of the message.

If messaging is not implemented on an existing network, the system layer interface 110 may provide a process for transmitting and routing messages in a network. The interface 110 may provide commands and/or functions for nodes within the network to request a message from another node, to send a message from one node to another node within the network, and or to interpret the message received at a node. The interface 110 may provide libraries of commands and/or functions to establish the structure of the messages, such as the length supported, and whether the messages may scroll. The application programmer may not need to develop a new interface 110 with or within the underlying network to develop a messaging application for the network. The system layer interface abstraction removes the need to accommodate for the network maintenance and transport protocol, and may allow a network independent application development environment.

Remote Device Updating

Figure 13:
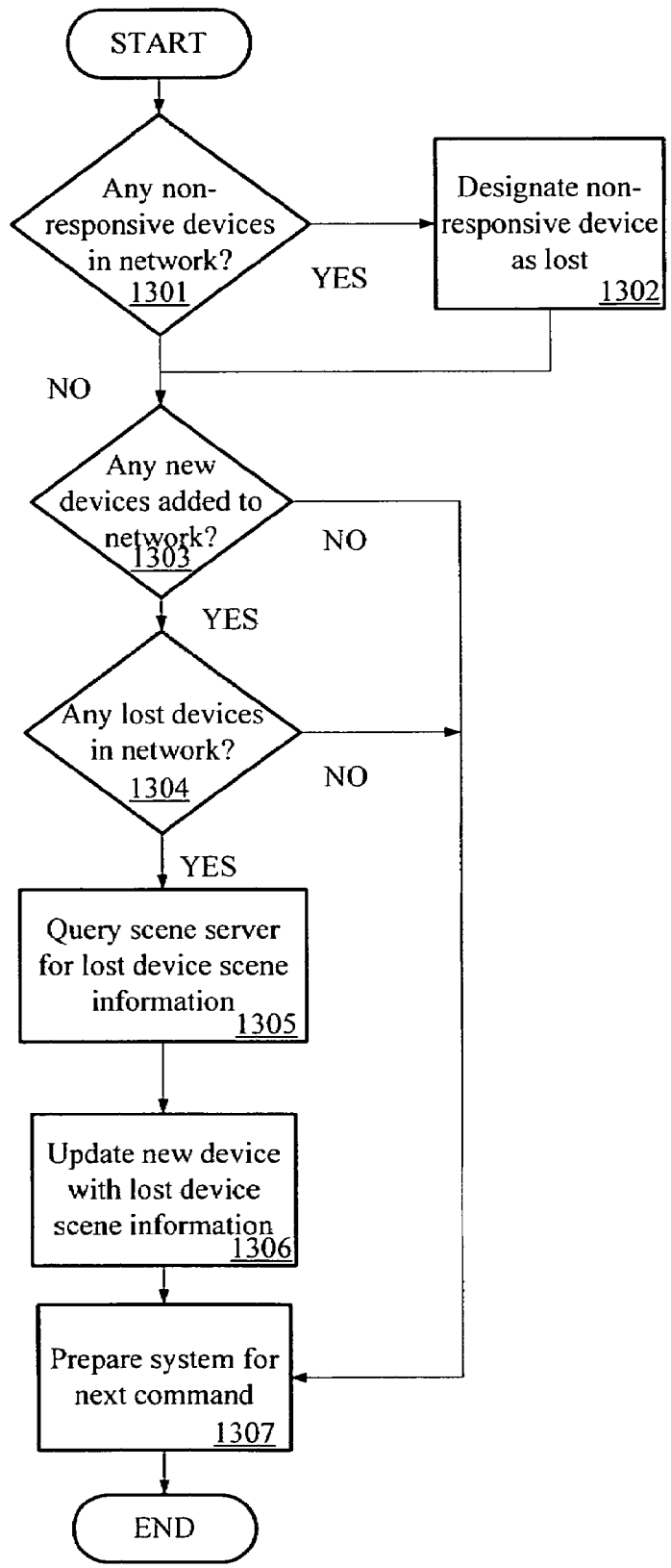
FIG. 13 is a process for upgrading a remote device in a home automation network.

The system layer interface 110 may provide a method for updating a remote device in a network as illustrated in FIG. 13. The network may include a network such as described in U.S. patent application Ser. No. 11/227,988, System for Home Automation, filed Sep. 15, 2005, which is incorporated herein by reference. The remote device may be a handheld remote for a home automation network 300 as depicted in FIG. 3. The remote device may also include other portable or remote devices that are in communication with a network, such as portable digital assistants (PDA's), cellular phones, laptops, portable music or video players, radios, and/or other entertainment devices. The method may query devices in the network to determine if there are devices that have not communicated their status to the network recently, at act 1301. This act may accomplished by a status server in the home automation network, and the devices may be remote controllers communicating with the home automation network. If the method determines that a device has not communicated its status recently, the network will designate the non-responsive device as a lost device, at act 1302. The method may then determine, at act 1303, if a new remote device has been added to the network. If the method determines that a new device has been added to the network, the method will determine, at act 1304, if there are lost devices in the network. If there are lost devices, the method may query the scene server for lost device scene information, at act 1305, and may update, at act 1306, the new device with the lost device's scene information from the network scene server. The lost device may not be removed from the network. It may remain designated as a lost device. The lost device may be re-integrated with the network if the lost device is found again or resumes communication with the network. If there are no lost devices, or after a lost device's scene information has been copied to the new device, the network may prepare to process the next instruction, at act 1307.

Like the methods shown above, the sequence diagrams may be encoded in a signal bearing medium, a computer readable medium such as a memory, programmed within a device such as one or more integrated circuits, or processed by a controller or a computer. If the methods are performed by software, the software may reside in a memory resident to or interfaced to the network, a communication interface, or any other type of non-volatile or volatile memory interfaced or resident to the network. The memory may include an ordered listing of executable instructions for implementing logical functions. A logical function may be implemented through digital circuitry, through source code, through analog circuitry, or through an analog source such as through an analog electrical, audio, or video signal. The software may be embodied in any computer-readable or signal-bearing medium, such as a home automation network carrier wave for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "computer data signal," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. An automation network, comprising:
   an automation network device in communication with the automation network; and
   a system layer interface encoded in a computer-readable medium and configured to interface with a transport layer and an application layer of the automation network for multiple distinct automation network devices which includes the automation network device, wherein the system layer interface comprises an upgrade command library configured to transmit application upgrade data to the multiple distinct automation network devices.

2. The automation network of claim 1, where the upgrade command library comprises at least one of an application upgrade request command and an application upgrade data command, where the application upgrade request command is configured to request a packet of upgrade data to be transmitted across the network and the application upgrade data command is configured to program a firmware or a software of a target network device.

3. The automation network of claim 2, where the target network device is configured to transmit the application upgrade request command to request a next packet of application upgrade data from the automation network.

4. The automation network of claim 3, where the target network device is configured to receive an application upgrade bulk data command from the automation network.

5. The automation network of claim 4, where the target network device is configured to process the application upgrade data command to program the target network device based on the packet of application upgrade data.

6. A method for programming an automation network device in communication with an automation network, where the automation network includes an access point coupled with an external network, the method comprising:
   receiving application upgrade data at the access point, where the application upgrade data includes upgrade data associated with a target automation network device in communication with the automation network, where the automation network includes a system layer interface encoded in a computer-readable medium, the system layer interface being configured to interface with a transport layer and an application layer of the automation network for multiple distinct automation network devices;
   transmitting the application upgrade data to the target automation network device through the automation network;
   requesting a next application upgrade data packet to be transmitted across the automation network with an application upgrade request command transmitted from the target automation network device; and
   programming an application stored in the target automation network device with an application upgrade data command transmitted to the target automation network device.

7. The method of claim 6, where requesting a next application upgrade data packet comprises initially transmitting the application upgrade request command from the target automation network device before receiving the application upgrade data.

8. The method of claim 6, where transmitting the application upgrade data comprises accessing a transport layer command configured to transmit data within the automation network.

9. The method of claim 8, further comprising accessing the system layer interface, where the system layer interface includes an upgrade command library and a transport layer interface library, where accessing the transport layer command comprises accessing the transport layer interface library associated with the transport layer command required to transmit the application upgrade data.

10. The method of claim 6, further comprising identifying, by the access point, a need for data in the target automation network device; and pushing the data to the target automation network device.

11. The method of claim 6, further comprising processing the received application upgrade data at the access point.

12. The method of claim 11, where processing the received application upgrade data includes performing at least one of integrity checks, packetization, and error checks on the received application upgrade data.

13. A computer program stored on a computer-readable medium and executed by a processor, the computer program capable of updating an automation network device in communication with an automation network, where the automation network includes an access point coupled with an external network, the computer program comprising a computer-readable medium comprising:
- computer-executable code executable to receive application upgrade data at the access point, where the application upgrade data includes upgrade data associated with a target automation network device in communication with the automation network, where the automation network includes a system layer interface encoded in a computer-readable medium, the system layer interface being configured to interface with a transport layer and an application layer of the automation network for multiple distinct automation network devices;
- computer-executable code executable to transmit the application upgrade data to the target automation network device through the automation network;
- computer-executable code executable to request a next application upgrade data packet to be transmitted across the automation network with an application upgrade request command transmitted from the target automation network device; and
- computer-executable code executable to program an application stored in the target automation network device with an application upgrade data command transmitted to the target automation network device.

14. The computer program of claim 13, where the computer-executable code executable to request a next application upgrade data packet comprises computer-executable code executable to initially transmit the application upgrade request command from the target automation network device before receiving the application upgrade data.

15. The computer program of claim 13, where the computer-executable code executable to transmit the application upgrade data comprises computer-executable code executable to access a transport layer command configured to transmit data within the automation network.

16. The computer program of claim 15, further comprising computer-executable code executable to access the system layer interface coupled with the home automation network, where the system layer interface includes an upgrade command library and a transport layer interface library, where the computer-executable code executable to access the transport layer commands comprises computer-executable code executable to access the transport layer interface library associated with the transport layer command required to transmit the application upgrade data.

17. The computer program of claim 13, further comprising computer-executable code executable to identify, by the access point, a need for data in the target automation network device; and computer-executable code executable to push the data to the target automation network device.

18. The computer program of claim 13, further comprising computer-executable code executable to process the received application upgrade data at the access point.

19. The computer program of claim 18, where the computer-executable code executable to process the received application upgrade data includes computer-executable code executable to perform at least one of integrity checks, packetization, and error checks on the received application upgrade data.

20. The computer program of claim 13, further comprising computer-executable code executable to determine the target automation network device based on an application upgrade data identifier included with the application upgrade data received at the access point.

* * * * *